US006639174B2

(12) United States Patent
Augeraud et al.

(10) Patent No.: US 6,639,174 B2
(45) Date of Patent: Oct. 28, 2003

(54) PLASMA TORCH PROVIDED WITH A CERAMIC PROTECTIVE CAP

(75) Inventors: Regis Augeraud, Lesquin (FR); Michel Delzenne, Franconville (FR)

(73) Assignees: La Soudure Autogene Francaise, Paris (FR); L'Air Liquide - Societe Anonyme a Directoire et Conseil de Surveillance pour l'Etude et l'Exploitation des Procedes Georges Claude, Paris (FR)

(*) Notice: Subject to any disclaimer, the term of this patent is extended or adjusted under 35 U.S.C. 154(b) by 26 days.

(21) Appl. No.: 10/014,580

(22) Filed: Dec. 14, 2001

(65) Prior Publication Data

US 2002/0125220 A1 Sep. 12, 2002

(51) Int. Cl.[7] .............................................. B23K 10/00

(52) U.S. Cl. .............................. 219/121.5; 219/121.52; 219/121.48; 219/75

(58) Field of Search ......................... 219/121.5, 121.48, 219/121.52, 121.39, 74, 75, 76.16; 313/298.41, 298.51

(56) References Cited

U.S. PATENT DOCUMENTS 4,615,987 A 10/1986 Chyung et al.
4,672,163 A * 6/1987 Matsui et al. ................. 219/74
4,924,060 A * 5/1990 Delzenne ............... 219/121.48
5,034,593 A * 7/1991 Rice et al. .................. 219/136
5,591,357 A 1/1997 Couch, Jr. et al.
5,856,647 A 1/1999 Luo
6,137,079 A * 10/2000 Vincent et al. .......... 219/130.4

FOREIGN PATENT DOCUMENTS

| | | |
|---|---|---|
| JP | 57166373 | 10/1986 |
| JP | 62038772 | 2/1987 |
| JP | 1075059 | 3/1989 |
| JP | 11333581 | 12/1999 |

* cited by examiner

*Primary Examiner*—Mark Paschall
(74) *Attorney, Agent, or Firm*—Young & Thompson

(57) ABSTRACT

Protective cap for a plasma arc working torch, includes a cap body (7) having an opening (17) for the passage of plasma gas, the cap body (7) being made of at least one material of ceramic type. The ceramic is a silicon nitride or an aluminum silicate. Preferably, the ceramic cap body (7) is clad with boron nitride deposited on the external surface of the cap body, the thickness of the cladding of boron nitride being less than 3 mm. Torch provided with such a cap and its use in a steel plate plasma cutting operation.

19 Claims, 4 Drawing Sheets

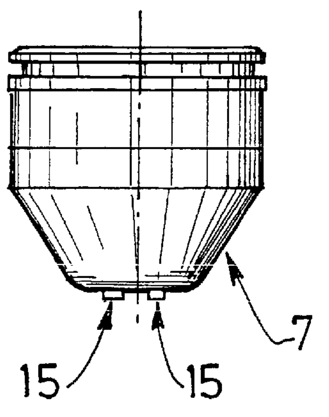
FIG.5
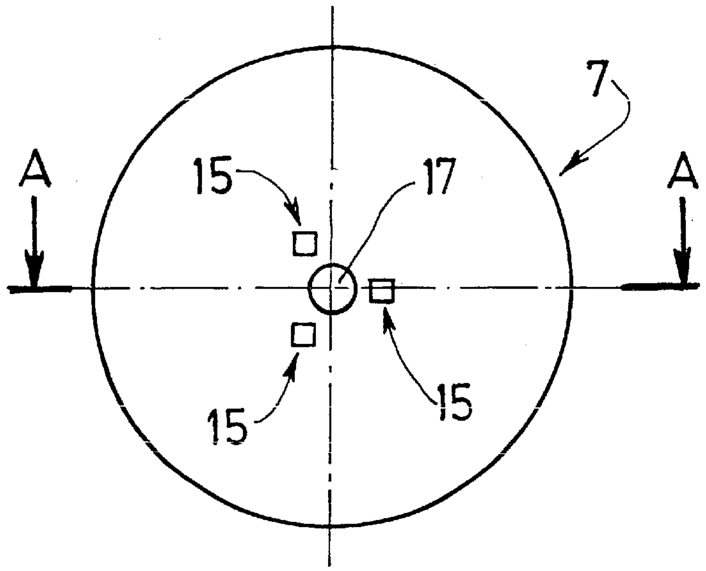
FIG.6
FIG.7
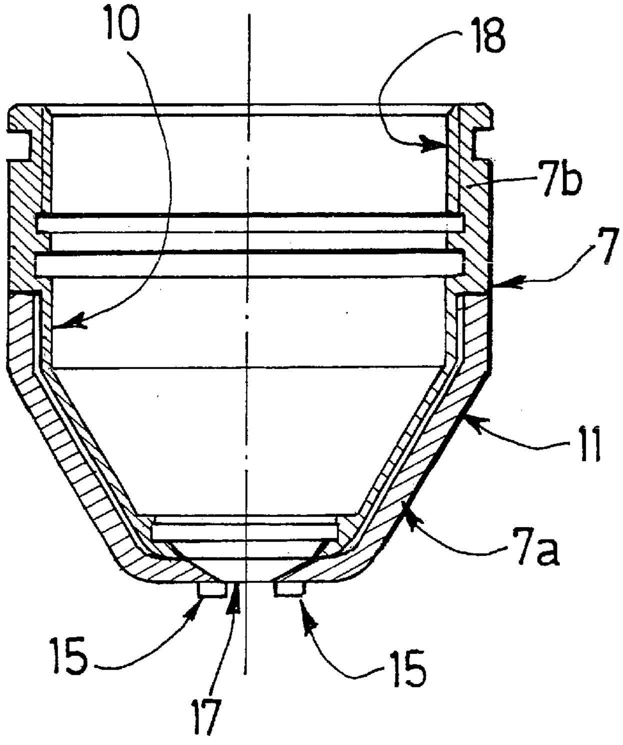

PLASMA TORCH PROVIDED WITH A CERAMIC PROTECTIVE CAP

BACKGROUND OF THE INVENTION

The present invention relates to a protective cap for the nozzle of a plasma arc torch and a plasma torch provided with such a cap.

DESCRIPTION OF THE RELATED ART

A plasma torch usable in the cutting, welding, marking, projection or any other operation for thermal treatment of a metallic or non-metallic material, conventionally comprises a copper or copper alloy electrode carrying a cylindrical insert generally of hafnium, tungsten or zirconium, on which the electric arc can take root which serves to ionize the gas supplying the torch, which is to say the predetermined flow rate of gas under pressure, so-called plasmagenic gas, which is distributed between the electrode and the nozzle and which flows through an orifice of said nozzle in the direction of the workpiece.

The electrode is generally centered above this ejection opening of the plasma jet arranged axially in the nozzle and which forms a constriction diaphragm.

In the particular case of a plasma cutting operation, the plasma cutting device or system conventionally comprises a plasma torch, a source of electric current, a system for striking the electric arc and one or several sources of fluids, in particular plasmagenic gas, if desired a protective gas or post-injected fluid, and a cooling fluid for the torch, generally distilled water.

Such torches or installations are well known to those skilled in the art because they have already been described in numerous documents which can be referred to for greater detail, particularly EP-A-599709, EP-A-872300, EP-A-801882, EP-A-941018, EP-A-144267, EP-A-410875, EP-A-772957, EP-A-902606, EP-A-810052, EP-A-845929, EP-A-790756, EP-A-196612, WO-A-89/11941, U.S. Pat. No. 4,521,666, U.S. Pat. No. 4,059,743, U.S. Pat. No. 4,163,891 and U.S. Pat. No. 5,591,357.

In known manner, plasma arc cutting uses the thermal and kinetic effects of a plasma jet to melt the material to be cut and to expel the melted material from the kerf formed consecutive to relative displacement of the torch and the workpiece; the composition or nature of the plasmagenic gas used varies according to the nature of the material to be cut.

The torch nozzle generally has an intermediate electric potential comprised between the electrical potential of the cathode and that of the plate to be worked.

However, for mechanical reasons or for errors of operation, it can happen that the torch comes into contact with the plate.

There is thus created a parasitic arc which instantly destroys the nozzle, which thus translates into a very substantial deterioration of the quality of the cut and/or requires the operator to change the nozzle.

The duration of use of the nozzle is thus reduced, which increases considerably the cost of the process because the nozzles used must be replaced more frequently by new nozzles.

So as to overcome this problem, it has already been proposed to arrange a protective cap about the nozzle of the torch so as to form an insulating mechanical barrier between the nozzle and the plate so as to protect the nozzle, during possible contact with the plate.

To do this, certain documents provide for the use of stumatite caps, which is a natural ceramic, or alumina.

However, it has been noted in practice that if these materials resist thermal shock, they are relatively fragile and can break easily in case of shock against a plate.

Moreover, it is also known to use a zirconia cap.

However, here again, it has been noted on an industrial scale that, if zirconia caps were more durable than stumatite caps or alumina caps, they have, on the other hand, a low resistance to shock and thermal stress.

The problem which accordingly arises is to have a cap for a plasma torch constituted by an insulating material permitting resisting not only high temperature of the plasma jet, which is to say thermal stresses, but also mechanical stresses, particularly shocks against the plate to be worked.

SUMMARY OF THE INVENTION

The object of the present invention is thus to solve these problems by providing a protective cap for plasma torch formed of a material having high resilience to resist mechanical shocks, a low coefficient of expansion to resist thermal shocks and which will moreover be a good electrical insulator.

Preferably, the protective cap according to the invention must also be relatively smooth, which is to say without roughness, such that the flag projected during working the metal will not adhere or will adhere the least possible to the cap.

The present invention thus relates to a protective cap for a plasma arc working torch, comprising a cap body comprising an opening for passage of plasma gas, said cap body being comprised of at least one material of ceramic type, characterized in that said ceramic is silicon nitride or aluminum silicate, preferably silicon nitride.

As the case may be, the cap of the invention can comprise one or several of the following characteristics:

- said cap body has at least one cylindrical section and an axis of revolution coaxial with said opening, preferably said cap body has the general shape of a sleeve or cup.
- the ceramic cap body is at least partially clad with boron nitride deposited on the external surface of the cap body, preferably the thickness of the boron nitride coating is less than 3 mm. The deposit of the layer of boron nitride on the external surface of the cap body is carried out, for example, by sputtering of boron nitride.
- the ceramic is aluminum silicate formed of $SiO_2$, $Al_2O_3$ and of one or several added constituents selected from $TiO_2$, $Fe_2O_3$, CaO, MgO, $K_2O$, $Na_2O$ and $P_2O_5$, and if desired unavailable impurities, in the following proportions: at least 60% by weight of $SiO_2$, at least 25% by weight of $Al_2O_3$ and the rest being essentially one or several of the added constituents selected from $TiO_2$, $Fe_2O_3$, CaO, MgO, $K_2O$, $Na_2O$ and $P_2O_5$. Preferably, the ceramic is aluminum silicate formed by 60 to 80% by weight $SiO_2$, preferably 60 to 70% of $SiO_2$, from 25 to 35% by weight of $Al_2O_3$, preferably from 28 to 34% by weight of $Al_2O_3$, and for the rest (up to about 100% by weight) one or several additional constituents selected from $TiO_2$, $Fe_2O_3$, CaO, MgO, $K_2O$, $Na_2O$ and $P_2O_5$.
- the ceramic is silicon nitride having one or several of the following properties: a density of 2 to 4 kg/dm$^3$, preferably 2.3 to 3.5 kg/dm$^3$; a resistance to thermal shock greater than or equal to 600° C.; a volume resistivity of at least $10^{10}\Omega\cdot$cm, preferably at least $10^{12}\Omega\cdot$cm; a coefficient of thermal expansion less than $6.10^{-6}$/° C., preferably less than $4.10^{-6}$/° C.; a flectural resistance at 20° C. of at least 200 MPa, preferably at least 600 MPa; and/or a compressive strength of at least 650 MPa, preferably at least 1500 MPa.

the body of the cap has a thickness comprised between 2 mm and 10 mm, at the level of or adjacent the opening for passage of the plasma gas.

the body of the cap comprises securement means permitting fixing or arranging securely the cap on a plasma torch about at least one portion of the nozzle of said torch, so as to surround and protect said nozzle.

the cap body is formed of a downstream portion at least partially of ceramic having the orifice, fixed to an upstream portion serving as a support permitting securing said cap body on the plasma torch, preferably of the downstream ceramic portion being fixed to the upstream portion by crimping, cementing or any other suitable technique and said upstream portion is of a metal or a metal alloy, for example brass.

the external wall of the cap body comprises one or several external protuberances, preferably said protuberances have a dimension comprised between 0.5 and 2 mm relative to the surface of the cap.

The invention also relates to a plasma torch comprising a torch body and a torch head provided with an electrode and at least one nozzle, characterized in that it comprises a protective cap according to the invention surrounding at least a portion of said nozzle so as to form an effective mechanical, electrical and thermal barrier about said nozzle.

As the case may be, the torch body and the torch head are separable from each other, as explained in EP0 599 709, to which reference may be had for further details.

Moreover, the invention also relates to an automatic machine, in particular for plasma cutting, comprising a torch according to the invention, as well as to the use of a torch or of a machine according to the invention to cut at least one metal plate by the use of a plasma jet, preferably a steel plate.

Thus, the inventors of the present invention have discovered that, among many ceramics adapted to be used as a material for making a cap for a plasma torch, namely the silicates comprising the steatites and the cordierites, titanium oxides, aluminas and zirconias, the natural ceramics, such as stumatite, certain among them having particularly unexpected properties, which is to say that they have a high resiliency to resist mechanical shocks, a low coefficient of thermal expansion to resist thermal shocks and can be rendered relatively smooth by simple machining.

These particular ceramics are silicon nitride (KERSIT™ or KERNIT™) and aluminum silicate, which ceramics permit harmonizing all of the above-mentioned requirements.

A protective cap for a plasma torch comprised by one or the other of the particular ceramics according to the present invention, is preferably dimensioned so as to cover at most the nozzle of the torch whilst not interfering with the operation of this latter, which is to say not disturbing the passage of the plasma gas stream.

Thus the distance between the plate and the nozzle being very small, the thickness of the cap must be as small as possible and must permit evacuation of the slag above the plate.

Moreover, protuberances on the cap permit holding the cap spaced from the plate without interfering with the evacuation of slag or of the gas.

Moreover, preferably, an external coating on the cap constituted by boron nitride permits, because of its physical-chemical properties, avoiding slag or molted metal from splashing from the plate during piercing of the latter, for example, not becoming stuck to the protective cap clad with this external cladding.

The invention will now be better understood from the accompanying drawings and from the examples, given by way of illustration but not limitation, of the invention.

BRIEF DESCRIPTION OF THE DRAWINGS

FIG. 5 shows the protective cap in profile.

FIG. 6 shows a bottom view of the cap of FIG. 5.

FIG. 7 is a longitudinal cross section on the line A—A of the FIGS. 5–6 cap.

FIG. 1 shows schematically a plasma coating torch supplied by an electric current source 5 connected to an electric arc striking system 6 permitting generating a pilot arc between the nozzle 2 and the electrode 1, and by various fluids, such as plasmagenic gas 3. An insulating protective cap 7 of ceramic according to the invention protects the nozzle 2 of the torch. According to a particular embodiment, the insulating cap of ceramic can be assembled by cementing, crimping or any other assembly means, to a metallic support of copper, brass or any other metallic material. During cutting, a plasma jet melts the material 11 to be cut and expels the molten material 10 from the kerf formed consecutive to relative movement of the torch and the workpiece 11. The plasma torch also comprises an electrode 1 from which the root of the electric arc proceeds, serving to ionize the gas supplying the torch, which is to say the predetermined stream of plasmagenic gas under pressure, which is distributed and flows in the plasma chamber located between the electrode 1 and the torch 2. The plasma jet is then expelled from the plasma chamber by an opening provided in the nozzle 2 and in the direction of the plate 11 to be cut. To do this, the electrode 1 is conventionally centered above the ejection opening of the jet plasma arranged axially in the torch 2.

DESCRIPTION OF THE PREFERRED EMBODIMENT

Figure 1:
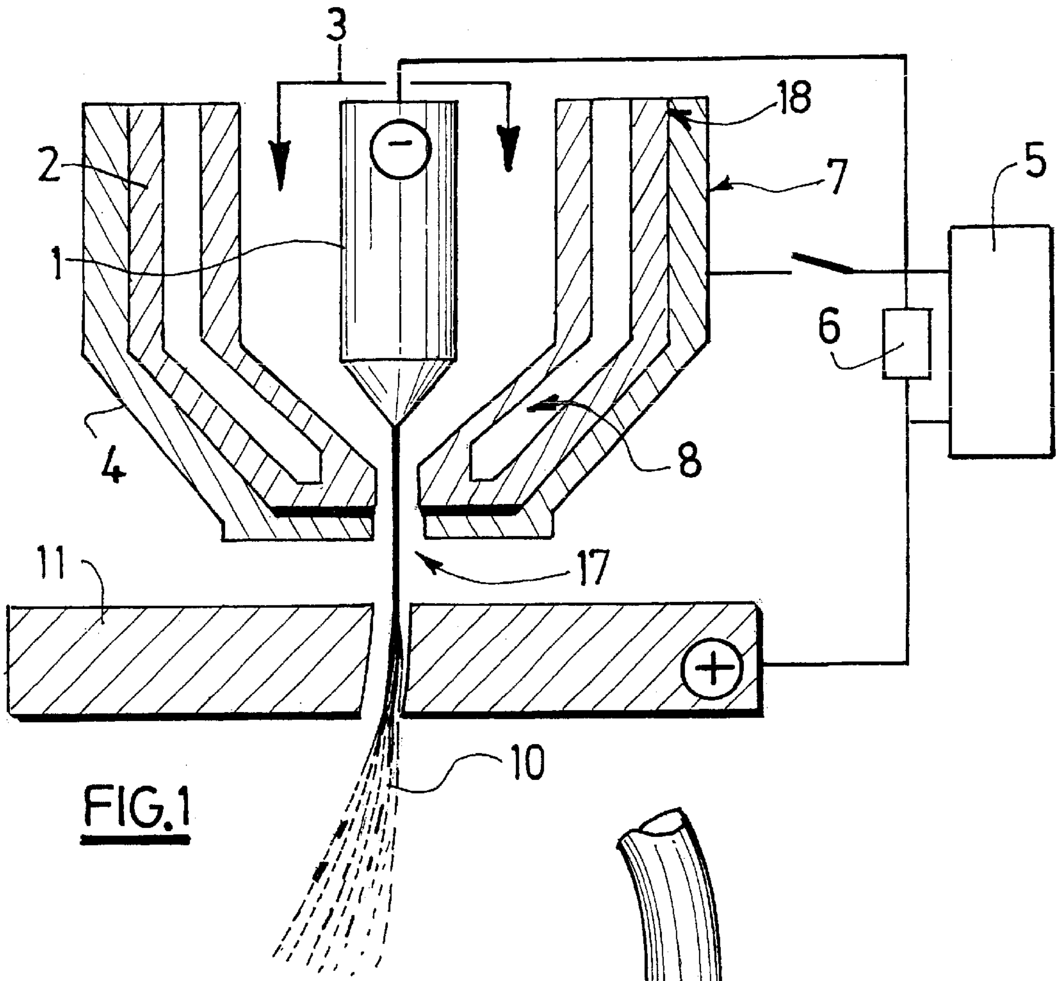
FIG. 1 shows a plasma coating torch according to the invention.
Figure 2:
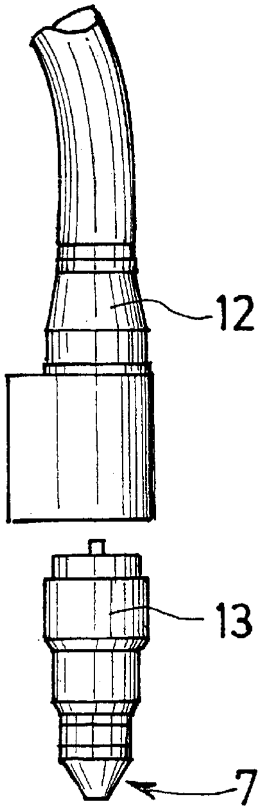
FIG. 2 schematically shows a cap according to the invention.
Figure 3:
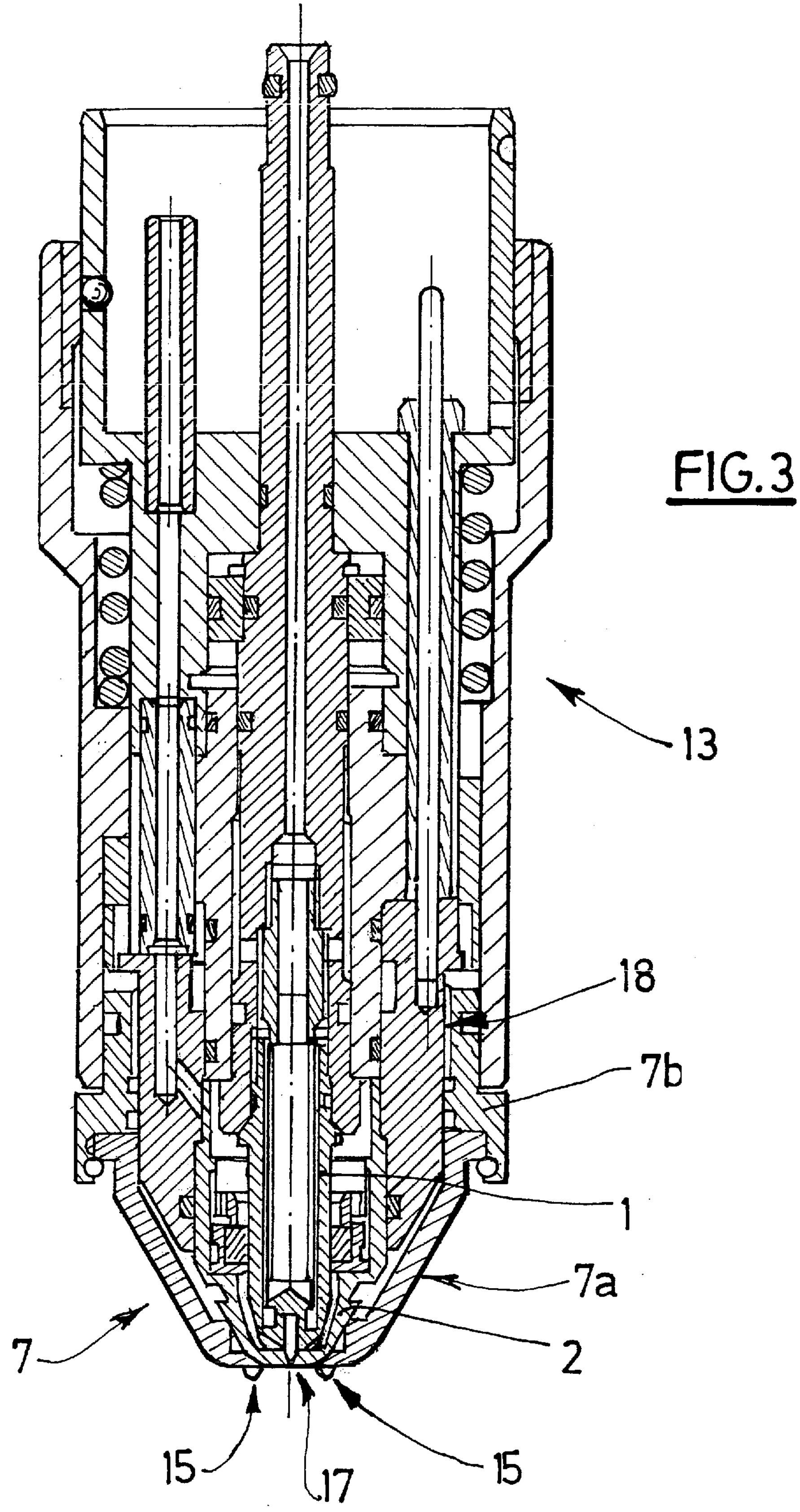
FIGS. 3–4 show the protective cap of the invention.
Figure 4:
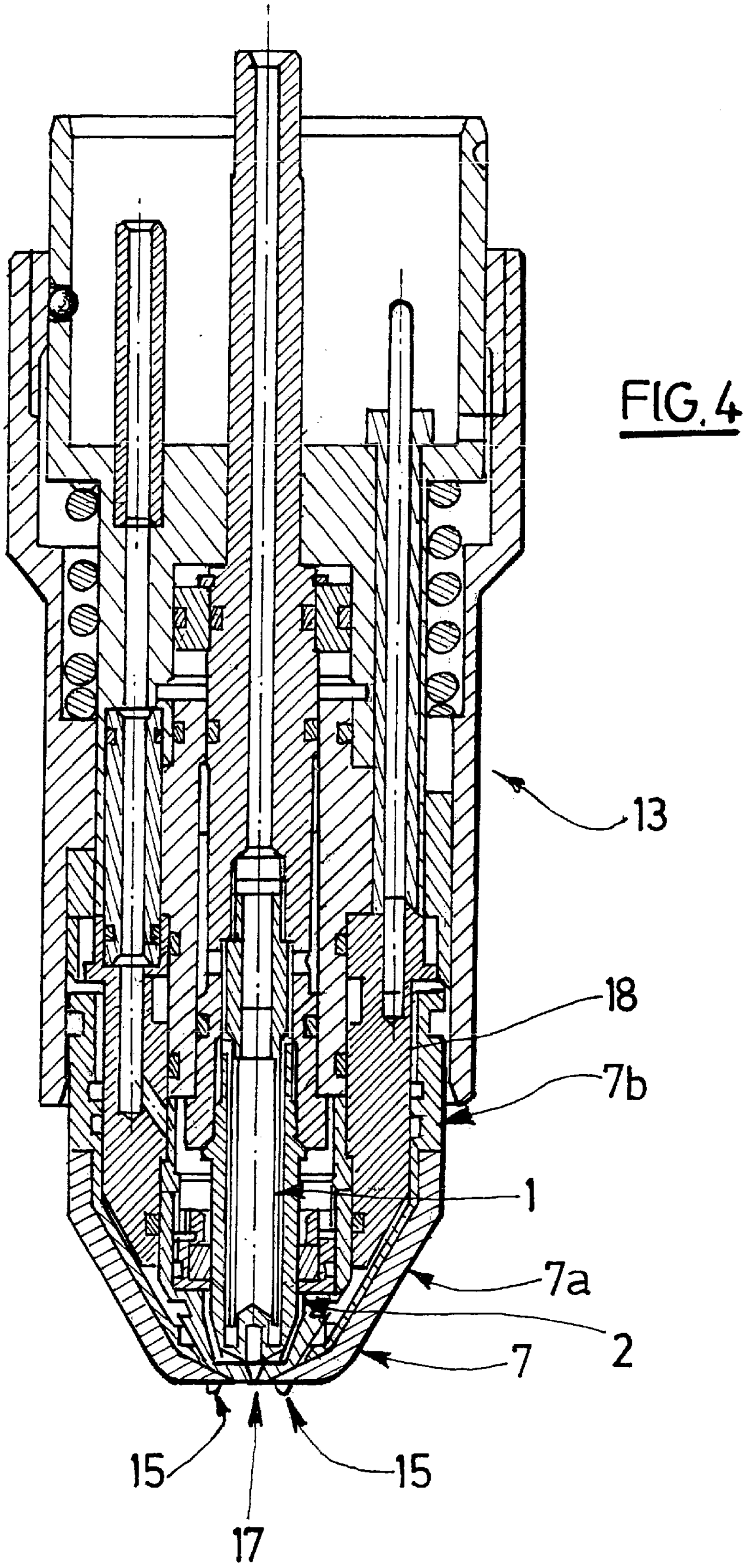

A cap according to the invention can be provided for any type of plasma torch, no matter whether it is in one part or in two parts separable from each other (schematically shown in FIG. 2), namely a torch head 13 and a torch body 12, such as the disassembleable torch described in EP0 599 709, as well as shown in FIGS. 3 and 4 which show the head 13 of the torch after separation of the body 12 from the torch.

As can be seen in FIGS. 3 or 4, the protective cap 7 according to the invention can be formed in two parts, namely:

a downstream part 7*a* of ceramic comprising the passage opening for the gas and adapted to surround the major portion of the torch 2, and an upstream portion 7*b* in metal, such as brass, serving as a support and metallic frame, and serving for the connection and securement of the cap on the torch 1.

In the embodiment of FIG. 3, the upstream ceramic portion is crimped on the metallic support, whilst in the embodiment of FIG. 4, the upstream ceramic portion is cemented to said metallic support.

FIG. 5 shows a protective cap according to the invention in profile so as to show the protuberances 15 on the downstream portion 7*a* of the body 7 of the cap which permit avoiding any mechanical contact with the plate without interfering with evacuation of the slag or the gas between the torch provided with the cap and the plate to be worked on.

FIG. 6 shows a bottom view of the cap of FIG. 5 better showing the arrangement of the protuberances 15, which are three in number and distributed about the outlet opening 17.

As can be seen in FIG. 7, which is a longitudinal cross-section on the line A—A of the cap of FIGS. 5 and 6, the protective cap for a plasma torch according to the invention is of cylindrical-truncated conical shape and is comprised, in this embodiment, of a particular ceramic 11 according to the present invention, fixed, for example by cementing, to an internal metallic structure or frame 10.

The cap body 7 also comprises securement means 18, such as a screw thread or the like, permitting securing or arranging securely the cap on a plasma torch about at least a portion of the nozzle of said torch, so as to surround and protect said nozzle.

Preferably, a layer of cladding of boron nitride is disposed along the ceramic portion and is renewed after a predetermined time of use of the torch or after wear of this latter.

The protective cap 7 according to the invention can be used to protect the nozzle and the other fragile pieces of the head of the torch of no matter what type of plasma cutting installation, whether manual or automatic.

Preferably, the torch according to the invention is of the monoflux type, the gas flow being adapted to be rotary or axial.

The invention has been described above with respect to the plasma cutting torch, but of course the application of this invention is not limited only to cutting torches and relates in whole or in part to marking, welding, projection torches and generally any torch for thermal treatment of metallic or non-metallic materials.

Example of an Aluminum Silicate Cap According to the Invention

Table I hereafter gives the chemical composition of an aluminum silicate usable to produce all or a portion of a protective cap for a plasma torch according to the present invention.

TABLE I

| Elements constituting the aluminum silicate | Proportion of each element (% by weight) |
|---|---|
| Ignition loss (drying at 110° C.) | 0.61 |
| $SiO_2$ | 63.58 |
| $Al_2O_3$ | 31.44 |
| $TiO_2$ | 1.79 |
| $Fe_2O_3$ | 1.02 |
| CaO | 0.11 |
| MgO | <0.08 |
| $K_2O$ | 0.81 |
| $Na_2O$ | 0.23 |
| $P_2O_5$ | 0.18 |
| TOTAL | about 99.77 |

The values (%) are determined by determining the weight ratio in grams of each constituent per 100 grams of material (aluminum silicate) dried at 110° C. and are determined by x-ray spectrometry.

Example of a Silicon Nitride Cap According to the Invention

The following Table II gives the characteristics of several silicon nitrides (NS1, NS2, NS3) usable to produce all or a part of a protective cap for a plasma torch according to the present invention.

TABLE II

| Properties | NS1 | NS2 | NS3 |
|---|---|---|---|
| Density (in kg/dm$^3$) | 2.5 | 3.3 | 3.2 |
| Thermal shock resistance (variation of temperature in ° C.) | 200 | 850 | 650 |
| Volume resistivity (in Ω.cm) | $>10^{10}$ | $>10^{12}$ | $>10^{12}$ |
| Coefficient of thermal expansion ($10^{-6}$/° C.) | 3.1 | 3.3 | 3.3 |
| Flexure resistance at 20° C. (in MPa) | >600 | >600 | >600 |
| Compressive resistance (in MPa) | 650 | >3000 | >3000 |

The silicon nitrides (NS1, NS2, NS3) having the above characteristics are available commercially, particularly from the MORGAN-MATROC company under the marks RBSN, HPSN and SSN, respectively, or else from the NORTON-DEMARQUEST company under the marks KERSIT™ or KERNIT™.

The silicon nitrides NS2 and NS3 are preferred because they have thermal and mechanical resistance properties and insulating properties, that are better than those of NS1.

What is claimed is:

1. Protective cap for a plasma arc working torch, comprising a cap body (7) comprising an opening (17) for passage of plasma gas, at least one portion of said cap body (7) being comprised of at least one ceramic type material, characterized in that said ceramic is aluminum silicate formed of $SiO_2$, $Al_2O_3$ and one or several additional constituents selected from $TiO_2$, $Fe_2O_3$, CaO, MgO, $K_2O$, $Na_2O$ and $P_2O_5$, in the following proportions: at least 60% by weight of $SiO_2$, at least 25% by weight of $Al_2O_3$ and the rest being essentially one or several additional constituents selected from $TiO_2$, $Fe_2O_3$, CaO, MgO, $K_2O$, $Na_2O$ and $P_2O_5$, preferably the ceramic is aluminum silicate formed of 60 to 80% by weight $SiO_2$, from 25 to 35% by weight of $Al_2O_3$ and the rest (up to about 100% by weight) one or several additional constituents selected from $TiO_2$, $Fe_2O_3$, CaO, MgO, $K_2O$, $Na_2O$ and $P_2O_5$.

2. Cap according to claim 1, characterized in that said cap body (7) has at least one cylindrical cross-section and an axis of revolution coaxial with said opening (17), preferably said cap body (7) has the general shape of a sleeve or a cup.

3. Cap according to claim 1, characterized Mn that said ceramic cap body (7) is at least partially clad with boron nitride deposited on the external surface of the ceramic cap body.

4. Cap according to claim 3, wherein the thickness of the boron nitride coating is less than 3 mm.

5. Cap according to claim 1, characterized in that said cap body (7) is formed by a downstream portion (7*a*) at least partially of ceramic having the opening (17), fixed to an upstream portion (7*b*) serving as a support permitting securing said cap body (7) to a plasma torch.

6. Cap according to claim 5, wherein the downstream portion (7*a*) in ceramic is fixed to the upstream portion (7*b*) by clinching or cementing and said upstream portion (7*b*) is of metal or metallic alloy.

7. Cap according to claim 1, characterized in that the external wall of the cap body (7) comprises one or several external protuberances (15), preferably said protuberances (15) have a dimension comprised between 0.5 and 2 mm relative to the surface of the cap (7).

8. Protective cap for a plasma arc working torch comprising a cap body (7) comprising an opening (17) for passage of plasma gas, at least one portion of said cap body (7) being comprised of at least one material of ceramic type, characterized in that said ceramic is silicon nitride having one or several of the following properties:

a density of 2 to 4 $kg/dm^3$, a thermal shock resistance greater than or equal to 600° C., a volumetric resistivity of at least $10^{10}\Omega\cdot cm$, a coefficient of thermal expansion less than $6.10^{-6}$/° C., a flexure resistance at 20° C. of at least 200 MPa, a compressive resistance of at least 650 MPa.

9. Cap according to claim 8, characterized in that said cap body (7) has at least one cylindrical cross-section and an axis of revolution coaxial with said opening (17), preferably said cap body (7) has the general shape of a sleeve or a cup.

10. Cap according to claim 9, characterized in that the ceramic is aluminum silicate formed of $SiO_2$, $Al_2O_3$ and one or several additional constituents selected from $TiO_2$, $Fe_2O_3$, CaO, MgO, $K_2O$, $Na_2O$ and $P_2O_5$, in the following proportions: at least 60% by weight of $SiO_2$, at least 25% by weight of $Al_2O_3$ and the rest being essentially one or several additional constituents selected from $TiO_2$, $Fe_2O_3$, CaO, MgO, $K_2O$, $Na_2O$ and $P_2O_5$, preferably the ceramic is aluminum silicate formed of 60 to 80% by weight $SiO_2$, from 25 to 35% by weight of $Al_2O_3$ and the rest (up to about 100% by weight) one or several additional constituents selected from $TiO_2$, $Fe_2O_3$, CaO, MgO, $K_2O$, $Na_2O$ and $P_2O_5$.

11. Plasma torch comprising a torch body (12) and a torch head (13), provided with an electrode and at least one nozzle (2), characterized in that it comprises a protective cap (7, 7*a*, 7*b*, 17) according to claim 1 surrounding at least in part said nozzle (2) so as to form a mechanical, electrical and thermal barrier about said nozzle (2).

12. Torch according to claim 8, characterized in that the torch body (12) and the torch head (13) are removable from each other.

13. Automatic machine, in particular for plasma cutting, comprising a torch according to claim 8.

14. The use of a torch according to claim 11, to cut at least one metallic plate by using a plasma jet.

15. The use of a torch according to claim 14, wherein the plate is a steel plate.

16. Protective cap for a plasma arc working torch, comprising a cap body (7) comprising an opening (17) for passage of plasma gas, at least one portion of said cap body (7) being comprised of at least one ceramic type material, characterized in that said ceramic is aluminum silicate, wherein said ceramic cap body (7) is at least partially clad with boron nitride deposited on the external surface of the ceramic cap body.

17. Cap according to claim 16, characterized in that said cap body (7) is formed by a downstream portion (7*a*) at least partially of ceramic having the opening (17), fixed to an upstream portion (7*b*) serving as a support permitting securing said cap body (7) to a plasma torch.

18. Cap according to claim 16, characterized in that the external wall of the cap body (7) comprises one or several external protuberances (15), preferably said protuberances (15) have a dimension comprised between 0.5 and 2 mm relative to the surface of the cap (7).

19. Cap according to claim 16, wherein the thickness of the boron nitride coating is less than 3 mm.

* * * * *